Feb. 6, 1945. J. JANDASEK 2,368,711
TURBO TRANSMISSION
Filed Jan. 29, 1942

INVENTOR
Joseph Jandasek.
BY
Gray & Smith
ATTORNEYS.

Patented Feb. 6, 1945

2,368,711

UNITED STATES PATENT OFFICE 2,368,711

TURBOTRANSMISSION

Joseph Jandasek, Detroit, Mich., assignor to Bendix Aviation Corporation, South Bend, Ind., a corporation of Delaware Application January 29, 1942, Serial No. 428,645

14 Claims. (Cl. 74—189.5)

This invention relates to transmissions and more particularly to a fluid transmission having a plurality of energy absorbing sections successively operable to efficiently transmit varying degrees of applied torque to a driven shaft.

An object of this invention resides in the provision of a fluid transmission having a plurality of automatically operable energy absorbing sections which may be successively or simultaneously employed to transmit varying degrees of applied power.

A further object of the invention resides in the provision of a fluid clutch having a plurality of spaced energy absorbing sections operably connected to a driven shaft through gear means of variable ratios in such a manner that the different sections may be successively or simultaneously employed to absorb energy from a driving impeller and transmit it to a driven shaft.

A further object resides in the provision of a fluid clutch having a removable energy absorbing member operably connected to a driven shaft through mechanical gearing in such a manner as to multiply torque at relatively low speeds of the driven shaft.

Another object of the invention is to provide a fluid clutch having a plurality of successive independently operable sections each of which is operably connected to a driven shaft through separate motion transmitting means to transmit varying degrees of applied torque to a driven shaft in accordance with the speed of the driven shaft.

Still a further object resides in the provision of a transmission wherein at heavy loads and low speeds torque is transmitted from a fluid transmission through mechanical gearing to the driven shaft and at higher speeds where a corresponding reduction of the load on the driven shaft is encountered, torque may be transmitted to the driven shaft through fluid operated means directly connected with the driven shaft.

Yet a still further object of the invention is to provide a transmission having a plurality of successively operable mechanical stages to transmit energy from successive sections of an energy absorbing member of a fluid transmission under varying conditions of torque multiplication, and wherein the successively operable stages of the mechanical gearing may be rendered inoperative by variation of fluid reaction in the fluid transmission.

Another object resides in the provision of a retractable energy absorbing member adapted to be automatically introduced into or withdrawn from a fluid circuit in accordance with variations of fluid reaction in the power transmitting fluid circuit to control gear means interposed between a driving and a driven shaft.

Other objects and advantages of this invention will be apparent from the following detailed description considered in connection with the accompanying drawing, submitted for purposes of illustration only, and not intended to define the scope of the invention, reference being had for that purpose to the subjoined claims.

In the drawing wherein similar reference characters refer to similar parts throughout the several views.

Before explaining in detail the present invention it is to be understood that the invention is not limited in its application to the details of construction and arrangement of parts illustrated in the accompany drawing, since the invention is capable of other embodiments and of being practiced or carried out in various ways. Also it is to be understood that the phraseology or terminology employed herein is for the purpose of description and not of limitation.

Figure 1:
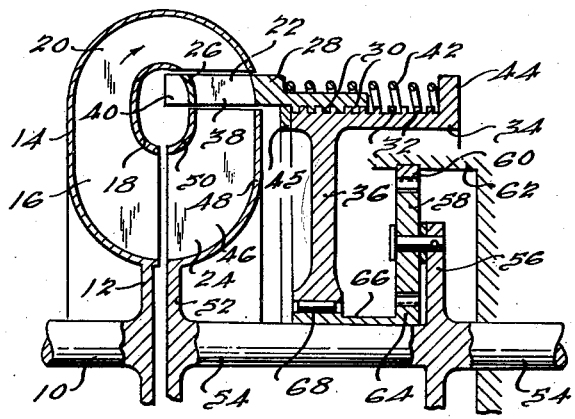
Fig. 1 is a longitudinal sectional view of one desirable embodiment of the invention.

Referring now more particularly to Fig. 1, it will be noted that a driving shaft 10 has a radially extended flange 12 supporting an impeller web 14. Suitable impeller blades 16 on the impeller web 14 support an impeller shroud 18 to provide a fluid energizing impeller channel 20. First and second section turbine members 22 and 24 are aligned with the impeller channel 20. The first section turbine member 22 has a fluid channel interposed between a turbine shroud 26 and a turbine hub 28 and suitable turbine vanes 38 arranged in the channel are secured to the shroud and hub.

The hub 28 is formed with internal helical threads 30 meshing with external helical threads 32 on a suitable member such for example as a cylinder 34 supported on a radially extended flange 36.

Yielding means such for example as a spring 42 interposed between the hub 28 and a flange 44 carried by the cylinder 34 may be provided to yieldingly urge the first section turbine member into the power transmitting fluid circuit.

Auxiliary turbine vanes 40 are carried by the shroud 26 and project beyond the shroud into the turbine channel when the first section turbine member 22 is retracted to substantially inoperative position by movement axially on the cylinder 34. Fluid reaction in the power transmitting fluid circuit exerted on the vanes 40 urge the first section turbine member 22 into the power transmitting fluid circuit.

The auxiliary turbine vanes 40 and the vanes 38 may be formed with a contour such that at slow speeds and heavy loads they are subjected to fluid reaction in the power transmitting fluid circuit to urge or maintain the first section turbine member 22 in the operative position within the power transmitting fluid circuit as illustrated. A suitable stop member 45 may be provided to limit axial movement of the member 22 relative to the power transmitting fluid circuit.

Under conditions of light load and high speed of operation fluid reaction in the power transmitting fluid circuit impinges on the backs of the vanes 38 to rotate the turbine section 22 in the reverse drection. The helical threads 30 and 32 then move the first section turbine member 22 out of the power transmitting fluid circuit against the resistance of the spring 42.

The second section turbine member 24 may be formed with suitable vanes 46 interposed between a turbine web 48 and a turbine shroud 50 to absorb energy from the power transmitting fluid circuit. The second section turbine web 48 is supported by a radially extended flange 52 on a driven shaft 54 preferably aligned with the driving shaft 10.

The driven shaft 54 has a flange 56 which supports a plurality of spaced planet pinions 58 meshing with a ring gear 60 on a stationary member 62. The planet pinions 58 mesh with a sun gear 64 fixed to a sleeve 66 concentrically mounted on the driven shaft 54. One-way driving means 68 may be interposed between the sleeve 66 and the radially extending flange 36 which supports the first section turbine member 22.

The operation of this device is as follows: Assume that the driven shaft 54 is idle and that power is applied to rotate the driving shaft 10. This results in rotation of the impeller member 16 causing energization of the fluid. The energy of the fluid is transmitted to the vanes 38 of the first section turbine member 22 at a suitable angle to transmit a relatively high proportion of its absorbed energy to the first section turbine member 22. The remainder of the transmittable power is received by the second section turbine vanes 46.

The energy absorbed by the first section turbine vanes 38 is transmitted through the turbine hub 28, cylinder 34, flange 36 and a one-way driving means 68 to rotate the sleeve 66. Rotation of the sleeve 66 results in rotation of the sun gear 64 rotatable on the driven shaft 54. The sun gear 64 rotates the pinions 58 in mesh with the stationary ring gear 60 and transmits energy to the flange 56 fixed to the driven shaft 54 to transmit energy to the driven shaft at high torque multiplication with a corresponding reduction in speed. The energy absorbed by the second section turbine vanes 46 is transmitted through the flange 52 directly to the driven shaft 54.

As the speed of rotation of the driven shaft 54 increases relative to the speed of rotation of the driving shaft 10, the circulating fluid impinges on the first section turbine vanes 38 at a decreased angle of incidence whereupon less energy is imparted to the first section turbine 22. This reduction of energy absorbed by the first section turbine 22 is accompanied by an increase in the energy absorbed by the second section turbine 24. The proportion of torque transmitted through the gearing is thus progressively decreased and the proportion of transmittable torque directly through the second section turbine 24 is progressively increased.

As the speed of rotation of the driven shaft increases further with reference to the speed of the driving shaft 10, the fluid reaction in the power transmitting fluid circuit decreases due to the variation of angular flow of fluid in the power transmitting fluid circuit. When the fluid reaction exerted on the first section turbine member 22 decreases below the zero point, a negative force is exerted on the vanes 38. This force is transmitted through the hub 28 to rotate the hub and member 22 on the cylinder 34. The first section turbine then rotates on the cylinder 34 and is retracted from the power transmitting fluid circuit by the action of the threads 30 and 32.

The planetary gearing thus becomes inoperative to transmit torque and virtually the entire torque is transmitted from the driving shaft 10 to the driven shaft 54 through the second section turbine member 24. During this phase of the operation the planetary gearing is unloaded and transmits virtually no power because of the interposition of the one-way driving means 68 between the driven shaft 54 and the flange 36. If desired, the one-way driving means 68 may be eliminated because when the first stage turbine member 22 is retracted from the power transmitting fluid circuit it is virtually inoperative.

If desired, manually operable means may be provided to control the position of the first section turbine member 22 relative to the power transmitting fluid circuit.

Figure 2:
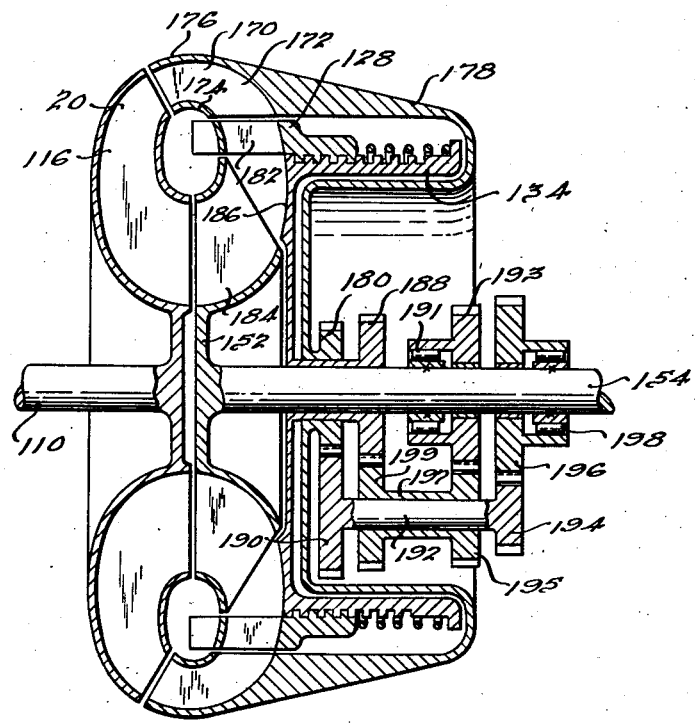
Fig. 2 is a longitudinal sectional view of another embodiment of the invention.

The embodiment of the invention illustrated in Fig. 2 is similar in many respects to that illustrated in Fig. 1. Corresponding parts have therefore been given corresponding reference numerals with the addition of 100.

A first section turbine member 170 is positioned adjacent the outlet of the impeller channel 20. The first section turbine member 170 is formed with suitable vanes 172 interposed between a shroud member 174 and a web member 176. The turbine web member 176 is carried by a rotatable housing 178 having a spur gear 180 concentrically disposed with relation to the driven shaft 154.

A second section turbine channel 182 is interposed between the first section turbine member 170 and a third section turbine member 184. The second section turbine channel 182 corresponds structurally and functionally with the first section turbine member 22 of the embodiment of the invention illustrated in Fig. 1. The second section turbine member 182 is carried by the hub 128 axially shiftable on the cylinder 134. The cylinder 134 is carried by a flange 186 having a spur gear 188 rotatable on the driven shaft 154 adjacent the spur gear 180 connected to the first section turbine member 170.

The third section turbine member 184 corresponds with the second section turbine member 24 of the embodiment of Fig. 1. The turbine member 184 is operably connected through the flange 152 with the driven shaft 154 to transmit torque directly thereto.

The spur gear 180 connected to the first section turbine member 170 meshes with a spur gear 190 carried by a countershaft 192 rotationally fixed relative to the axis 110—154. The shaft 192 has another spur gear 194 meshing with a spur gear 196 rotatable on the driven shaft 154 and operably connected thereto through one-way driving means 198.

The spur gear 188 connected to the second section turbine member 182 meshes with a spur gear 199 fixed to a sleeve 197 having a spur gear 195 fixed thereto. The spur gear 195 meshes with a spur gear 193 operably connected with the driven shaft 154 through one-way driving means 191.

The operation of this embodiment of the invention is as follows: When the driven shaft 154 is stationary and power is exerted to rotate the driving shaft 110, energy is transmitted to the power transmitting fluid by the impeller blades 116. At low speed the majority of the transmittable energy is transmitted to the first section turbine member 170 and is transmitted through the housing 178, spur gears 180 and 190 through the countershaft 192 and spur gears 194 and 196 to the one-way driving means 198 which operates to transmit energy to the driven shaft 154 at high torque multiplication.

As the speed of rotation of the driven shaft 154 increases relative to the speed of the driving shaft 110, a progressively less proportion of power is absorbed by the first section turbine member 170 and an increased proportion of power is absorbed by the second section and third turbine members 182 and 184. The energy absorbed by the second section turbine member 182 is transmitted through the hub 128, cylinder 134, flange 186, spur gears 188 and 199, sleeve 197 and spur gears 195 and 193 through the one-way driving means 191 to the driven shaft 154. During this phase of the operation the first section turbine member 170 is virtually inoperative and rotates freely due to the interposition of the one-way driving means 198 which permits the driven shaft 154 to overrun the spur gear 196 and the associated gearing.

At light loads or high speeds the second section turbine member 182 is retracted from the power transmitting fluid circuit and the first section turbine member 170 idles freely in the forward direction because of the one-way driving means 198 interposed between the spur gear 196 and the driven shaft 154. During this stage of the operation virtually all of the power transmitted is directed through the third stage turbine member 184 directly connected through the flange 152 with the driven shaft 154. The one-way driving means 191 between the driven shaft 154 and the spur gear 193 permits the driven shaft to overrun the gearing interposed between the second section turbine member 182 and the driven shaft 154.

I claim:

1. A transmission comprising a driving shaft, a driven shaft, fluid energizing means carried by the driving shaft, a plurality of spaced energy absorbing turbine sections, gear connecting means between one of said spaced turbine sections and the driven shaft to multiply torque and transmit power to the driven shaft, another of said turbine sections being directly connected to the driven shaft, one-way driving means between the gear connecting means and the driven shaft whereby the driven shaft may overrun the gear means, and fluid reaction responsive means to shift one of said turbine sections out of the power-transmitting fluid circuit.

2. A transmission comprising driving and driven shafts, fluid energizing and energy absorbing means interposed between the driving and driven shafts and forming a power transmitting fluid circuit, said energy absorbing means being formed of a plurality of spaced sections, connecting means between one of said sections and the driven shaft, gear means interposed between another of said sections and the driven shaft, said gear means including one-way driving means operable to transmit multiplied torque from the driving to the driven shaft and to permit the driven shaft to overrun said turbine section, and fluid reaction responsive means to shift the last-mentioned turbine section out of the power-transmitting fluid circuit.

3. A transmission comprising a driving shaft having an impeller, a driven shaft having a turbine cooperating with the impeller to form a power transmitting fluid circuit, said turbine being formed in a plurality of spaced sections, one of said sections being connected directly to the driven shaft to transmit torque at high speeds and light loads from the driving to the driven shaft, and another of said sections being carried by a rotatable cylinder, connecting means between said turbine section and the cylinder whereby the turbine section may occupy an operative or a substantially inoperative position relative to the power transmitting fluid circuit, yielding means urging said turbine section toward the operative position in the power transmitting fluid circuit, planetary gearing including spaced ring and sun gears, one-way driving means between said cylinder and the sun gear, and planet pinions interposed between said sun and ring gears and operably connected to the driven shaft.

4. A transmission comprising a driving shaft having an impeller, a driven shaft having a turbine cooperating with the impeller to form a power transmitting fluid circuit, said turbine comprising a plurality of spaced sections, connecting means between one of said sections and the driven shaft whereby energy may be transmitted directly from said turbine section to the driven shaft, gear means interposed between another of said turbine sections and the driven shaft whereby energy may be transmitted from said other turbine section through the gear means, means interposed between said last named turbine section and the gear means whereby said turbine section may occupy an inoperative position substantially out of the power transmitting fluid circuit, a third turbine section, gear means between said third turbine section and the driven shaft whereby power may be transmitted to the driven shaft at high torque multiplication, and one-way driving means between said third turbine section and the driven shaft whereby said third turbine section may rotate freely in one direction when the driven shaft overruns said turbine section.

5. A transmission comprising a driving shaft, an impeller carried by the driving shaft, a driven shaft, a turbine section fixed to the driven shaft and cooperating with the impeller to provide a power transmitting fluid circuit to transmit energy from the driving shaft to the driven shaft at substantially no torque multiplication, a retractable auxiliary turbine section interposed between the outlet from the impeller and the inlet to said first named turbine section, gear means between the retractable turbine section and the driven shaft whereby power may be transmitted from the driving to the driven shaft with increased torque multiplication with a corresponding reduction in speed, and one-way driving means between the last named turbine section and the driven shaft.

6. A transmission comprising a driving shaft, an impeller carried by the driving shaft, a driven shaft, a turbine section fixed to the driven shaft and adapted to cooperate with the impeller to provide a power transmitting fluid circuit to transmit energy from the driving shaft to the driven shaft at substantially no torque multiplication, a retractable auxiliary turbine section interposed between the outlet from the impeller and the inlet to the turbine section fixed to the driven shaft, a rotatable cylinder supporting said auxiliary turbine, one-way driving means between the cylinder and the driven shaft, planetary gearing including planet pinions operably connected to the driven shaft, and a sun gear interposed between said one-way driving means and the planet pinions whereby power may be transmitted from said cylinder to the driven shaft with an increase in torque ratio.

7. A transmission comprising a driving shaft having an impeller, a driven shaft having a turbine cooperating with the impeller to form a power transmitting fluid circuit, said turbine comprising first, second and third section members, said third section turbine member being directly connected to the driven shaft, torque multiplying means interposed between the first and second section turbine members comprising spaced spur gears, one-way driving means between said spur gears and the driven shaft, the second section turbine member having fluid deflecting vanes adapted to occupy operative or inoperative positions in or substantially out of the power transmitting fluid circuit, and yielding means urging said vanes toward the operative position in the power transmitting fluid circuit.

8. A transmission comprising a driving shaft having an impeller thereon, a driven shaft having a turbine thereon cooperating with the impeller to provide a power transmitting fluid circuit, said turbine comprising first, second and third sections, said third section being directly connected to the driven shaft, a rotatable housing for the first section, gear means carried by said housing concentrically of the driven shaft, speed varying gear means interposed between said housing gear and the driven shaft, one-way driving means between said speed varying gear means and the driven shaft, a rotatable member supporting the second section for movement into and out of the circuit, gear means for said second section rotatable on the driven shaft, speed varying gear means interposed between said rotatable member gear means and the driven shaft, one-way driving means between said speed varying gear means and the driven shaft whereby said turbine sections may be progressively rendered inoperative as the speed of rotation of the driven shaft increases relative to the speed of rotation of the driving shaft.

9. A transmission comprising a driving shaft having an impeller thereon, a driven shaft having a turbine thereon cooperating with the impeller to provide a power transmitting fluid circuit, said turbine comprising a plurality of separate sections, one being movable into and out of the circuit, gearing systems of varying ratios connecting at least two of the sections to the driven shaft, and one-way driving means between the lowest ratio gear means and the driven shaft.

10. A transmission comprising a driving shaft, a driven shaft, fluid energizing means carried by the driving shaft, a plurality of spaced energy absorbing turbine sections, cooperating with the fluid energizing means to form a power transmitting fluid circuit, gear connecting means between one of said spaced turbine sections and the driven shaft to multiply torque and transmit power to the driven shaft, another of said turbine sections being directly connected to the driven shaft, and one-way driving means between the gear connecting means and the driven shaft whereby the driven shaft may overrun the gear means, one of said plurality of turbine sections having fluid deflecting vanes movable between operative and inoperative positions in and substantially out of the power transmitting fluid circuit.

11. A transmission comprising driving and driven shafts, fluid energizing and energy absorbing means interposed between the driving and driven shafts and forming a power transmitting fluid circuit, said energy absorbing means being formed of a plurality of spaced sections, direct connecting means between one of said sections and the driven shaft, gear means interposed between another of said sections and the driven shaft, said gear means including one-way driving means operable to transmit multiplied torque from the driving to the driven shaft and to permit the driven shaft to overrun said turbine section, one of said plurality of turbine sections having fluid deflecting vanes movable between operative and inoperative positions in and substantially out of the power transmitting fluid circuit.

12. In a transmission having a driving shaft, an impeller carried by the driving shaft, a driven shaft, a multi-section turbine operably connected to the driven shaft and adapted to cooperate with the impeller to provide a power transmitting fluid circuit to transmit energy from the driving shaft to the driven shaft, one of said turbine sections being directly connected to the driven shaft to transmit energy to the driven shaft at substantially no torque multiplication, another of said turbine sections being movable into and out of the circuit between the outlet from the impeller and the inlet to said first named turbine section, gear means between said last named turbine section and the driven shaft whereby power may be transmitted from the driving to the driven shaft with increased torque multiplication with a corresponding reduction in speed, and means to render the last named turbine section inoperative.

13. A transmission comprising an impeller, a sectionalized turbine driven thereby and providing in conjunction therewith a power transmitting fluid circuit, a driven shaft, one turbine section being fixedly secured thereto, the other turbine section being shiftable into and out of the circuit, and a gearing system including a one-way drive connecting the shiftable turbine section to the shaft.

14. A transmission comprising an impeller for the energization of fluid and a sectionalized turbine for receiving energy from the fluid providing in conjunction with one another a circuit for the fluid, a driven shaft, one of the turbine sections being fixedly secured thereto, another of the turbine sections being shiftable into and out of the circuit, and gearing systems of varying ratios including one-way drives connecting the shiftable turbine section and at least one other turbine section to the shaft.

JOSEPH JANDASEK.